(12) United States Patent
Bunnell

(10) Patent No.: US 10,311,095 B2
(45) Date of Patent: Jun. 4, 2019

(54) METHOD AND SYSTEM FOR QUALITATIVELY AND QUANTITATIVELY ANALYZING EXPERIENCES FOR RECOMMENDATION PROFILES

(71) Applicant: Renée Bunnell, New York, NY (US)

(72) Inventor: Renée Bunnell, New York, NY (US)

( * ) Notice: Subject to any disclaimer, the term of this patent is extended or adjusted under 35 U.S.C. 154(b) by 350 days.

(21) Appl. No.: 14/600,739

(22) Filed: Jan. 20, 2015

(65) Prior Publication Data

US 2015/0220604 A1 Aug. 6, 2015

Related U.S. Application Data

(60) Provisional application No. 61/928,780, filed on Jan. 17, 2014.

(51) Int. Cl.
G06F 16/435 (2019.01)
(52) U.S. Cl.
CPC .......... G06F 16/436 (2019.01); G06F 16/435 (2019.01)
(58) Field of Classification Search
CPC ......... G06F 17/30032; G06F 17/30029; G06F 16/436; G06F 16/435
USPC ....................................................... 707/776
See application file for complete search history.

(56) References Cited

U.S. PATENT DOCUMENTS

| | | | | |
|---|---|---|---|---|
| 6,539,375 B2 * | 3/2003 | Kawasaki | ............... | G06Q 30/02 |
| 6,611,842 B1 * | 8/2003 | Brown | ................... | G06Q 30/02 |
| 6,785,671 B1 * | 8/2004 | Bailey | ............... | G06F 17/30864 |
| | | | | 705/26.81 |
| 8,229,873 B1 * | 7/2012 | Dolan | ................... | G06Q 30/00 |
| | | | | 706/45 |
| 8,768,892 B2 * | 7/2014 | Myerson | .................. | G06N 5/04 |
| | | | | 700/104 |
| 8,805,854 B2 * | 8/2014 | Chen | ................. | G06F 17/30053 |
| | | | | 707/749 |

(Continued)

FOREIGN PATENT DOCUMENTS

JP 2009134671 A * 6/2009 ............. H04H 60/33

OTHER PUBLICATIONS

Liu et al., "Personalized News Recommendation Based on Click Behavior", In Proceedings of the 14th International Conference on Intelligent User Interfaces (IUI), pp. 31-40, ACM, New York, 2010.*

(Continued)

*Primary Examiner* — Phuong Thao Cao
(74) *Attorney, Agent, or Firm* — Hunton Andrews Kurth LLP

(57) ABSTRACT

Example embodiments include User Experience Analysis (UEA) system and method. The system and method are employed to qualitatively and quantitatively analyze user experiences, in order to provide electronic content recommendations. The system and method may be employed to provide user specific content recommendations that are based on a determined value-congruence, or relevancy, between electronic content and the recommendation profile generated for the user. The recommendation profile may be determined based on qualitatively and quantitatively analyzing positive appraisal sensations. The positive appraisal sensations may be associated with the user's physiological and/or psychological responses to predetermined content consuming experiences presented to the user, according to the embodiments.

15 Claims, 5 Drawing Sheets

(56) References Cited

U.S. PATENT DOCUMENTS

| | | | | |
|---|---|---|---|---|
| 8,832,099 | B2* | 9/2014 | Howes | G06F 17/30011 705/14.1 |
| 9,256,848 | B2* | 2/2016 | Williams | G06Q 30/0625 |
| 9,602,884 | B1* | 3/2017 | Eldering | H04H 60/00 |
| 2001/0023401 | A1* | 9/2001 | Weishut | G06Q 30/0278 725/46 |
| 2002/0059094 | A1* | 5/2002 | Hosea | H04N 21/25891 725/10 |
| 2003/0195877 | A1* | 10/2003 | Ford | G06F 17/30705 |
| 2003/0237087 | A1* | 12/2003 | Kurapati | H04N 5/44543 725/9 |
| 2004/0002995 | A1* | 1/2004 | Martino | H04N 7/163 |
| 2005/0065935 | A1* | 3/2005 | Chebolu | H04L 63/102 |
| 2005/0260610 | A1* | 11/2005 | Kurtz | G06F 19/18 435/6.11 |
| 2006/0048053 | A1* | 3/2006 | Sembower | G06F 17/30867 715/253 |
| 2006/0293921 | A1* | 12/2006 | McCarthy | A61B 5/6815 705/2 |
| 2007/0169148 | A1* | 7/2007 | Oddo | H04N 5/44543 725/46 |
| 2008/0120280 | A1* | 5/2008 | Iijima | G06F 17/30911 |
| 2008/0222671 | A1* | 9/2008 | Lee | G06Q 30/02 725/10 |
| 2008/0294655 | A1* | 11/2008 | Picault | G06Q 30/02 |
| 2010/0017709 | A1* | 1/2010 | Wakai | G06F 16/95 715/273 |
| 2010/0076968 | A1* | 3/2010 | Boyns | H04W 4/21 707/732 |
| 2010/0250341 | A1* | 9/2010 | Hauser | G06F 17/30867 707/769 |
| 2010/0313141 | A1* | 12/2010 | Yu | G06F 17/30702 715/747 |
| 2010/0325135 | A1* | 12/2010 | Chen | G06F 17/30053 707/759 |
| 2011/0016102 | A1* | 1/2011 | Hawthorne | G06F 17/30032 707/706 |
| 2011/0035387 | A1* | 2/2011 | Loeb | G06F 17/30867 707/754 |
| 2011/0125753 | A1* | 5/2011 | Dow | G06F 17/30029 707/740 |
| 2011/0125761 | A1* | 5/2011 | Naaman | G06F 17/30731 707/748 |
| 2011/0125783 | A1* | 5/2011 | Whale | G06F 17/30029 707/769 |
| 2011/0238478 | A1* | 9/2011 | Gottfurcht | G06Q 20/105 705/14.25 |
| 2012/0016642 | A1* | 1/2012 | Li | G06Q 30/02 703/2 |
| 2012/0059785 | A1* | 3/2012 | Pascual Leo | G06Q 30/02 706/50 |
| 2012/0229664 | A1* | 9/2012 | Solomon | H04N 5/23229 348/222.1 |
| 2012/0278268 | A1* | 11/2012 | Hamalainen | G06F 17/30029 706/46 |
| 2013/0018882 | A1* | 1/2013 | Listermann | G06Q 50/01 707/736 |
| 2013/0080611 | A1* | 3/2013 | Li | H04N 21/222 709/223 |
| 2013/0097110 | A1* | 4/2013 | Kwon | G06N 5/02 706/50 |
| 2013/0198098 | A1* | 8/2013 | Schneiderman | G06Q 10/105 705/320 |
| 2013/0204825 | A1* | 8/2013 | Su | G06N 5/04 706/46 |
| 2013/0268394 | A1* | 10/2013 | Nikankin | G06Q 30/0631 705/26.7 |
| 2013/0331993 | A1* | 12/2013 | Detsch | G05B 15/02 700/275 |
| 2014/0059066 | A1* | 2/2014 | Koloskov | H05K 7/02 707/758 |
| 2014/0108976 | A1* | 4/2014 | Steiner | G06K 9/00436 715/765 |
| 2014/0122227 | A1* | 5/2014 | Reinshagen | G06Q 30/0269 705/14.53 |
| 2014/0156676 | A1* | 6/2014 | Brust | G06F 3/0481 707/748 |
| 2014/0207518 | A1* | 7/2014 | Kannan | G06Q 30/0201 705/7.29 |
| 2014/0221181 | A1* | 8/2014 | Pickett | A61B 5/00 482/139 |
| 2014/0223467 | A1* | 8/2014 | Hayton | G06Q 30/0631 725/18 |
| 2014/0279250 | A1* | 9/2014 | Williams | G06Q 30/0625 705/26.62 |
| 2014/0323817 | A1* | 10/2014 | el Kaliouby | A61B 5/165 600/300 |
| 2014/0370472 | A1* | 12/2014 | Kaiser | G09B 7/02 434/236 |
| 2014/0380347 | A1* | 12/2014 | Naveh | H04N 21/4667 725/14 |
| 2015/0017618 | A1* | 1/2015 | Portenga | G09B 7/02 434/236 |
| 2015/0178511 | A1* | 6/2015 | Klappert | G06F 21/6245 726/27 |
| 2015/0182843 | A1* | 7/2015 | Esposito | G06K 9/00342 700/91 |
| 2015/0220604 | A1* | 8/2015 | Bunnell | G06F 17/30029 707/776 |
| 2015/0324356 | A1* | 11/2015 | Andres Gutierrez | H04N 21/436 707/734 |
| 2015/0326688 | A1* | 11/2015 | Aarnio | H04L 67/30 707/748 |
| 2018/0373717 | A1* | 12/2018 | Eriksson | G06F 17/16 |

OTHER PUBLICATIONS

Makris et al., "Category Ranking for Personalized Search", Journal of Data & Knowledge Engineering, vol. 60, Issue 1, Jan. 2007, pp. 109-125. (Year: 2007).*

Scherer et al., "Human Emotion Experiences Can Be Predicted on Theoretical Grounds: Evidence from Verbal Labeling", PLOS One, Mar. 2013, vol. 8, Issue 3, pp. 1-8. (Year: 2013).*

* cited by examiner

METHOD AND SYSTEM FOR QUALITATIVELY AND QUANTITATIVELY ANALYZING EXPERIENCES FOR RECOMMENDATION PROFILES

CROSS-REFERENCE TO PROVISIONAL APPLICATION

This application claims priority to U.S. Provisional Application 61/928,780, filed on Jan. 17, 2104, the disclosure of which is incorporated by reference into the present application in its entirety.

TECHNICAL FIELD

This application to systems and methods for analyzing qualitative and quantitative user experience data for providing recommendations of content.

BACKGROUND OF THE INVENTION

Large amounts of multimedia content, such as movies, music, and video, which are all readily accessible to users via the Internet can cause difficulties for users attempting to find particularly relevant content. Many users find searching through the vast quantities of content, much of the content comprising divergent types and categories, to be both cumbersome and time consuming. These situations have caused techniques for effectively recommending target information to become vital in the area of on-line content. Specifically, by efficiently recommending significantly smaller amounts of content (e.g., multimedia content), which may be considered relevant by a user, these mechanisms can considerably reduce that amount of information content e.g., that has to be searched, downloaded, or viewed by the user.

Current mechanisms for providing recommendations in popular content provider systems such as Netflix and Amazon are based on on-line purchasing histories and browsing histories of existing users. For example, Netflix, a provider of on-line movies, recommends a list of movies to be viewed by the current user based on the predetermined browsing history of other users. The recommendation is considered relevant, as it is based on existing users who also previously viewed the same movie as the current user. However, these known recommendation techniques generally rely on the responses and behaviors of various different users that may not be similar to that of the current user. Thus, recommendations provided using this aforementioned technique may not provide the content which is considered most relevant, or entertaining, to the user.

SUMMARY OF THE INVENTION

An example embodiment includes a method, including the steps of: initiating, by one or more computing devices, a user experience assessment with a user computer via a communications network, wherein the user experience assessment comprises one or more predetermined content consuming experiences; receiving, by the one or more computing devices, positive appraisal sensation data from the user computer, wherein the positive appraisal sensation data comprises user responses associated with the one or more predetermined content consuming experiences; analyzing, by the one or more computing devices, the positive appraisal data using a qualitative analysis algorithm and a quantitative analysis algorithm; determining, by the one or more computing devices, one or more positive appraisal categories corresponding to the positive appraisal data, wherein the one or more appraisal categories are determined based on the analysis; generating, by the one or more computing devices, a recommendation profile associated with the user, wherein the recommendation profile comprises the one or more positive appraisal categories; determining, by the one or more computing devices, whether one or more matches exist between the recommendation profile and coded content; generating, by the one or more computing devices, content recommendation information based on the determined matches; and transmitting, by the one or more computing devices, an electronic message to the user via the communications network, wherein the electronic message comprises the content recommendation information.

An example embodiment includes a system, having: a communications network; a user computer commutatively coupled to the communications network; and one or more computing devices communicatively coupled to the communications network, wherein the one or more computing devices operates to: initiate a user experience assessment with the user computer via the communications network, wherein the user experience assessment comprises one or more predetermined content consuming experiences; receive positive appraisal sensation data from the user computer, wherein the positive appraisal sensation data comprises user responses associated with the one or more predetermined content consuming experiences; analyze the positive appraisal data using a qualitative analysis algorithm and a quantitative analysis algorithm; determine one or more positive appraisal categories corresponding to the positive appraisal data, wherein the one or more appraisal categories are determined based on the analysis; generate a recommendation profile associated with the user, wherein the recommendation profile comprises the one or more positive appraisal categories; determine whether one or more matches exist between the recommendation profile and coded content; generate content recommendation information based on the determined matches; and transmit an electronic message to the user computer via the communications network, wherein the electronic message comprises the content recommendation information.

Furthermore, current recommendation mechanisms fail to explore the intersection of psychological, biological, and computer sciences in order to consider intrinsically motivated, receptive, emotional markers that are identifiable during consumer experiences such as watching movies, reading books, vacationing, dining, or watching television. These experiences are directly related to individuals' emotional traits, and can be incorporated into recommendation algorithms for further quantitative and qualitative analysis to measure for both well-being and loyalty.

Therefore, there is a need for a method and a system employed for providing recommendations based on the qualitative and quantitative analysis of experiences directly related to the user for which the recommendation is provided. Thus, multimedia content included in recommendations, in accordance with the example embodiments, are potentially more personalized and appropriate for the user. Consequently, the example embodiments provide increased user satisfaction based on analyzing the experiences of the recommended user.

These and other drawbacks exist.

DETAILED DESCRIPTION OF EXAMPLE EMBODIMENTS

Figure 1:
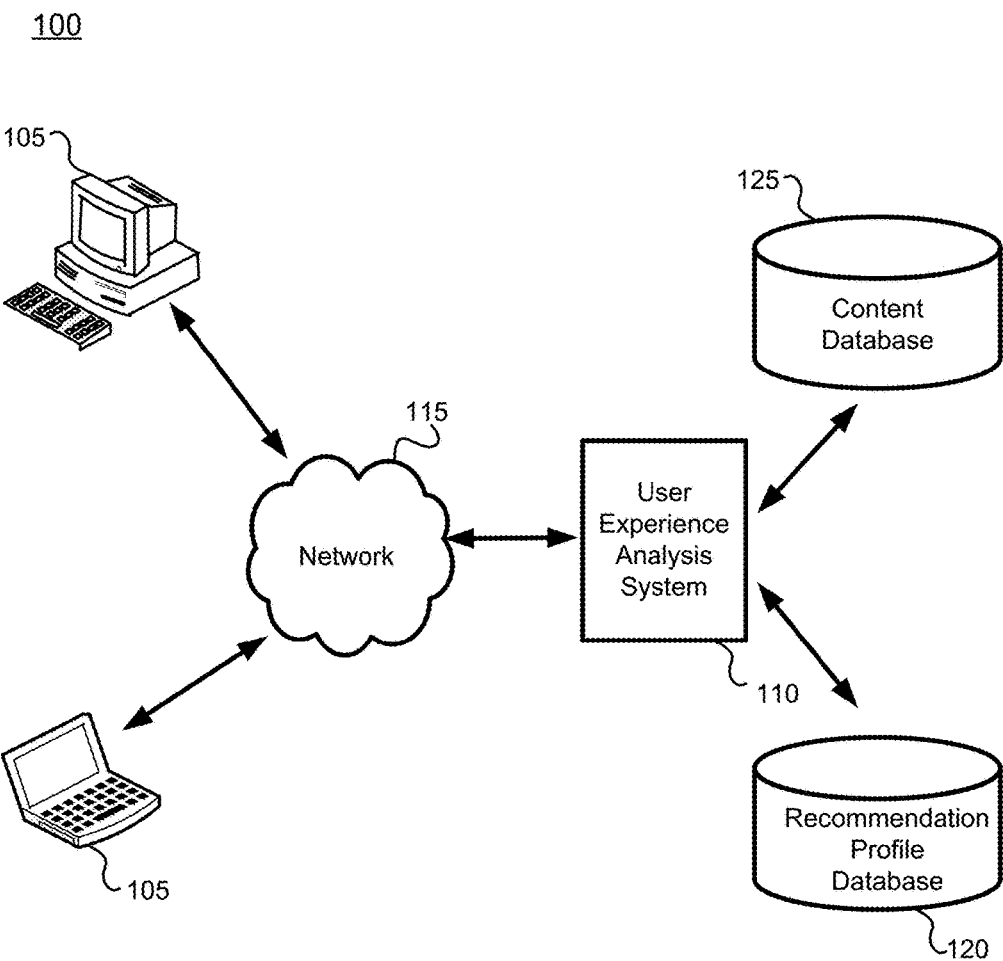
FIG. 1 illustrates a system for performing qualitatively and quantitatively analysis of user experiences in order to provide content recommendations, in accordance with an example embodiment.

It will be readily understood by those persons skilled in the art that the various embodiments described herein are capable of broad utility and application.

Example methods are provided by way of example herein, as there are a variety of ways to carry out the method disclosed herein. The methods depicted in the Figures may be executed or otherwise performed by one or a combination of various systems, such as described herein. Each block shown in the Figures represents one or more processes, methods, and/or subroutines carried out in the example methods. Each block may have an associated processing machine or the blocks depicted may be carried out through one processor machine. Furthermore, while the steps may be shown in a particular order, it should be appreciated that the steps may be conducted in a different order.

The description of example embodiments describes servers, portable electronic devices, and other computing devices that may include one or more modules, some of which are explicitly depicted in the figures, others are not. As used herein, the term "module" may be understood to refer to executable software, firmware, hardware, and/or various combinations thereof. It is noted that the modules are example. The modules may be combined, integrated, separated, and/or duplicated to support various applications. Also, a function described herein as being performed at a particular module may be performed at one or more other modules and/or by one or more other devices (e.g., servers) instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read-only memory (ROM), random access memory (RAM), as well as other physical media capable of storing software, and/or combinations thereof. Moreover, the figures illustrate various components (e.g., servers, portable electronic devices, client devices, computers, etc.) separately. The functions described as being performed at various components may be performed at other components, and the various components may be combined and/or separated. Other modifications also may be made.

According to example embodiments, the systems and methods may be computer implemented using one or more computers, incorporating computer processors. The computer implementation may include a combination of software and hardware. The computers may communicate over a computer-based network. The computers may have software installed thereon configured to execute the methods of the example embodiments. The software may be in the form of modules designed to cause a computer processor to execute specific tasks. The software may be stored on a tangible, non-transitory computer-readable medium. The computers may be configured with hardware to execute specific tasks. As should be appreciated, a variety of computer-based configurations are possible.

FIG. 1 is a system for analyzing qualitative and quantitative user experience data for providing recommendations of content, according to example embodiments. The system 100 may provide various functionality and features of the User Experience Analysis (UEA) system 110. According to an embodiment, the system 100 may be employed for qualitatively and quantitatively analyzing user experiences for providing recommendations of content. Specifically, the system 100 may support collecting, and subsequently analyzing, user specific information which relates human reactions (e.g., physiological, psychological, etc.) to various experiences. In an embodiment, positive appraisal experiences may include consuming particular types of content. Thereafter, the system may provide content recommendations based on a determined value-congruence between identified user reactions and correspondingly categorized content. The system 100 may include one or more user computers 105, a UEA system 110, a communications network 115, a recommendation profile database 120, and a content database 125.

According to an embodiment, the UEA system 110 may be connected to a communications network 115. The communications network may include one or more servers and/or computer processors. For example, the communications network 115 may be a wide area network (WAN), such as the Internet or a network connected to the Internet. The network may be a satellite or cellular-based network. Information and data may be exchanged through the network between the various devices. Furthermore, the communications network 115 may be a local area network (LAN), such as an intranet. It should be appreciated that the network may be a combination of local area networks, wide area networks, and external networks, which may be connected to the Internet.

In accordance with example embodiments, a plurality of user computers 105 may be connected to communications network 115 and the UEA System 110. The user computer 105 may be a personal computer such as desktop computer, running software which facilitates data collection and communications with the UEA system 110. The user computer 105 may be used to control and/or communicate with the UEA system 110.

Further, various technologies may be used to provide communication between the various processors and/or memories, as well as to allow the processors and/or the memories of the various embodiments to communicate with any other entity; e.g., so as to obtain further instructions or to access and use remote memory stores, for example. Such technologies used to provide such communication might include a network, such as a computer network, for example, the Internet, Intranet, Extranet, LAN, or any client server system that provides communication of any capacity or bandwidth, for example. Such communications technologies may use any suitable protocol such as TCP/IP, UDP, or OSI, for example. It should be appreciated that examples of computer networks used in the preceding description of example embodiments, such as the Internet, are meant to be non-limiting and example in nature.

According to an embodiment, software installed on the user device 105 may include real-time telecommunication applications and/or application suites, such as videoconferencing and webinar applications. Software executed on the user computer 105 may further provide an interface that allows the user to perform a wide variety of actions involving network-based access, retrieval, and/or consumption of content. For instance, the user computer 105 may use software, such as Windows Media Player, for downloading and viewing movies from the Internet. Additional devices may be either wired or wirelessly coupled to the user computer 105 in order perform various functions. For example, a biofeedback sensor may be connected to the user computer 105 which enables a user's physiological activity, such as brain waves, to be monitored and/or measured.

According to an embodiment, the user computer 105 may be one or more portable data processing platforms or portable electronic devices. In an example embodiment, each user computer 105 may be a portable electronic device or mobile electronic device. The portable electronic device may have communication capabilities over cellular, wireless, and/or wired type networks to transmit/receive data and/or voice communications.

The portable electronic device, by way of non-limiting examples, may include such portable computing and communications devices as mobile phones (e.g., cell or cellular phones), smart phones (e.g., iPhones, Android based phones, or Blackberry devices), personal digital assistants (PDAs) (e.g., Palm devices), laptops, netbooks, tablets, or other portable computing devices. These portable electronic devices may communicate and/or transmit/receive data over a wireless signal. The wireless signal may consist of Bluetooth, Wireless Application Protocol (WAP), Multimedia Messaging Service (MMS), Enhanced Messaging Service (EMS), Short Message Service (SMS), Global System for Mobile Communications (GSM)-based systems, Code Division Multiple Access (CDMA)-based systems, Transmission Control Protocol/Internet Protocols (TCP/IP), or other protocols and/or systems suitable for transmitting and receiving data from the portable electronic device. The portable electronic device may use standard wireless protocols which may include IEEE 802.11a, 802.11b, 802.11g, 802.11n, Near-Field Communications, and Bluetooth. Certain portable electronic devices may be Global Positioning System (GPS) capable. Other location systems may be used. The portable electronic device may include one or more computer processors and be capable of being programmed to execute certain tasks.

According to an embodiment, the UEA system 110 may be one or more computers, such as personal computers. In another embodiment, the UEA system 110 may include one or more servers. The UEA system 110 may include the functionality of a server system, such as, a UNIX based server, Windows 2000 Server, Microsoft IIS Server, Apache HTTP server, API server, Java server, Java Servlet, API server, ASP server, PHP server, HTTP server. Mac OS X server, Oracle server, IP server, or other independent server. For instance, a user (e.g., experience assessment administrator) may employ a computer communicatively connected to the UEA system 110 to further control and/or operate the functions supported by the one or more servers. According to an embodiment, the UEA system 110 may be one or more portable data processing platforms or portable electronic devices.

In an embodiment, the UEA system 110 may include conventional real-time telecommunication applications and/or application suites, to support network-based communications. The application suite and platform of the UEA system 110 may be employed to conduct network-based experience assessments, for example a WebEx session. The real-time communication may enable the UEA system 110 to distribute and receive positive appraisal data for analysis. The telecommunication applications may implement any mechanism that functions to transmit and/or receive audio, visual, and/or multimedia information.

According to an embodiment, software may be installed on the UEA system 110 that enables database management system (DBMS) operations to be performed. DBMS related programs may enable the UEA system 110 to operatively communicate with databases in order to store, modify, and extract information. The UEA system 110 software may also be employed to create and manipulate various data structures. For examples, queues may be employed for arranging and/or organizing the received positive appraisal experiences, positie appraisal sensations, and other data from the user computers 105. In an embodiment, the UEA system 110 may communicate with content database 125 and recommendation profile database 120 to store and/or retrieve data.

In an embodiment, the UEA system 110 may have a log-in associated therewith. The log-in may be used to allow access to the system. The log-in may require a particular input or it may accept a combination of inputs. The input may serve as an authentication of the user to the system and, in some embodiments, the system 100 in general. Various authentication or log-on systems and methods may be used. For example, these methods and systems may include entering a password or Personal Identification Number (PIN) or using a card to logon, either via swiping the card through a reader, such as a magnetic stripe reader or a smart chip reader, or through a radio frequency system (which may require that the card be placed in proximity to an appropriate reader (e.g., a contactless system), such as, for example, Radio Frequency Identification (RFID) or Near Field Communications (NFC). It should be appreciated that the card may include a combination of a magnetic strip, a smart chip, and radio frequency. Further, the use of the card is example only and the card may include fobs, stickers, and other devices. Biometrics may be used, such as fingerprints, facial recognition, speech recognition, palm vein scan, or retinal scan. A combination of these systems may be used. Biometrics may be used in addition to other log-in methods and systems.

Recommendation profile database 120 and content database 125 may be interconnected to the UEA system 110, and/or one or more user computers 105 via communications network 110. The recommendation profile database 120 and content database 125 may be implemented as external storage devices, for example database servers. Though illustrated as separate, the functionality and content of the recommendation profile database 120 and/or the content database 125 may be integrated into the UEA system. In an embodiment, the databases may be included as internal storage devices for the UEA system 110. The recommendation profile database 120 may include one or more recommendation profiles that have been created by the UEA system 110 using qualitative and quantitative analysis. Accordingly, the recommendation profiles may each be comprised of categorized positive appraisal sensations for the corresponding user. The recommendation profiles may serve to indicate the user's behavior and preferences in order to support content recommendation capabilities of the embodiments.

The content database 125 may include a plurality of audio, visual, and/or or multimedia electronic content. Content stored by the content database 125 may be various forms of multimedia data. The content may be transmitted to the user computer 105 and/or the UEA system 110 via the communications network 115. In an embodiment, the content may be subsequently consumed (e.g., purchased, viewed, heard, read, etc.) by a user. Examples of content include, but are not limited to, movies, books, video, television, music, and other forms of multimedia data. For purposes of illustration, the example embodiment discussed may involves on-line (e.g., Internet accessible) movie content. The content stored in content database 120 may be pre-categorized and/or categorized by the UEA system 110 according to associated content categories. In example embodiments, the value-congruence and content recommendation functions of the UEA system 110 may be implemented by retrieving and processing the categorized content in content database 125 and the recommendation profiles in recommendation profile database 120.

In an embodiment, the content database 125 may contain content from one or more data sources that may provide a plurality of information, services, and/or products via a communications network, such as the Internet. Data sources may include various distributors such as content providers, search engines, document listing providers, an electronic content source, a website host, and any other source that may serve to provide electronic content to users. According to the embodiment, the one or more data sources may transmit, or otherwise distribute, content to the content database 125.

In an embodiment, the content database 125 may include various database creating and managing functions. The database capabilities of the content database 125 may be implemented using various special-purpose programming languages, such as Structured Query Language (SQL), that may be designed for managing the data maintained by the content database 125. Thereafter, one or more software applications, for example Application Programming Interfaces (API), may be employed in order to define the particular capability, such as data mining, that may be employed by the content database 125. In an embodiment, the content database 125 capabilities may allow the stored content to be evaluated and subsequently manipulated. Content may be evaluated, for example text scanned, in order to retrieve information that may be further used to determine patterns, relationships, and characteristics that may be associated with the content. For example, the content database 125, may operate to text scan an electronic book, in order to recognize various text strings, and subsequently characterize the e-book as containing "humor." Accordingly, the content database 125 may operate to organize, for example separate and/or aggregate, the stored content according to characteristics resulting from performing the evaluation capabilities. The content database 125 may also be capable of creating models and/or graphical representations of the data in order to perform the one or more evaluation functions.

In an embodiment, the content database 125 may operate to automatically data mine a plurality of content providers for content. Thereafter, the mined content may be stored in the content database 125 itself, so as to be available to user of the UEA system. The content database 125 may also mine data related to the content, such as metadata. Data related to content may be any information that may serve to describe, or otherwise characterize, the data, such as programming language, title, source, and the like. The content database 125 may include functionality to automatically access content and/or metadata from the data sources. As an example, the content database 125 may automatically mine an on-line movie provider for metadata related to the content of 100,000 movies. The content database 125 may evaluate the metadata, so as to create and maintain various categories for the content. The movies, and any subsequently retrieved content, may be stored and maintained according to these content categories.

Each of the system devices 105, 110, 120, and 125 may establish communications with other parts of the system 100 over the communications network 115 as described above. The devices 105, 110, 120, and 125 may be geographically dispersed. Conversely, two or more of devices 105, 110, 120, and 125 may be located in close proximity. Upon successful initiation of communications between the network 115 and another part of the system 100, data may be exchanged between the various devices.

Figure 2:
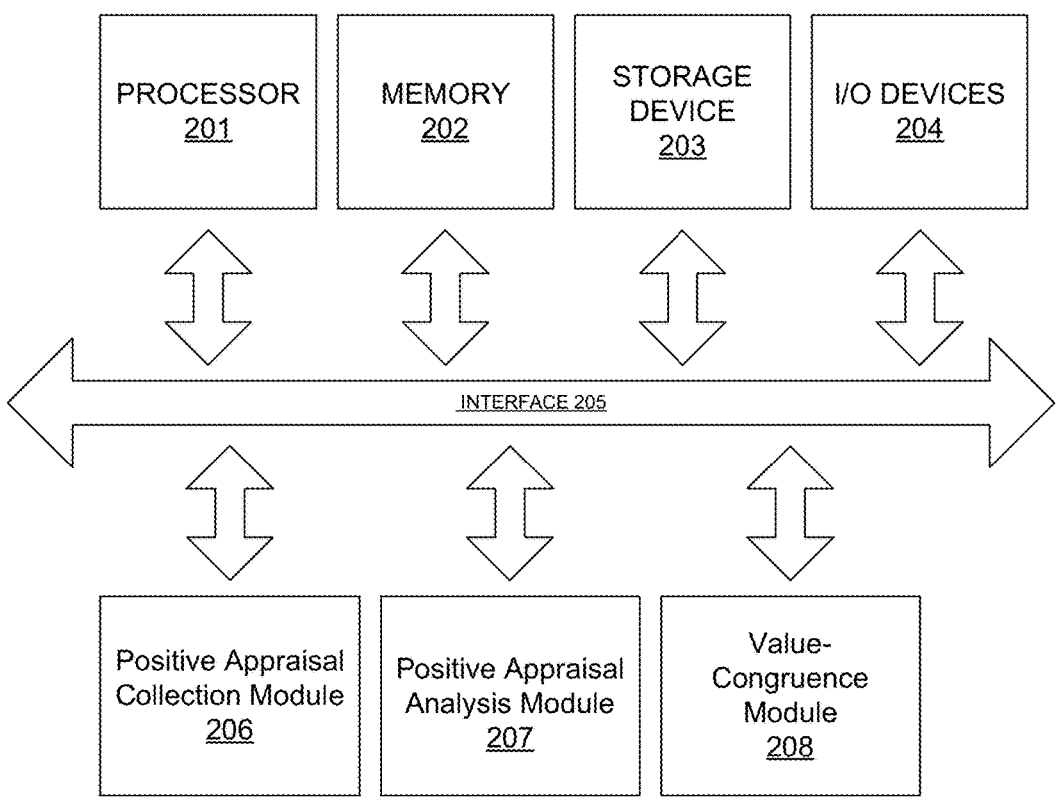
FIG. 2 illustrates internal components of a User Experience Analysis (UEA) system for performing qualitatively and quantitatively analysis of user experiences in order to provide content recommendations, in accordance with an example embodiment.

FIG. 2 depicts the components of the UEA system 200 for performing qualitatively and quantitatively analysis of user experiences in order to provide, for example, content recommendations in accordance with example embodiments.

The UEA system 200 may contain one or more hardware and software components in the internal configuration as depicted in FIG. 2. A processor 201 may be configured to control the functions of the UEA system 200. The processor 201 may execute software, firmware, and computer readable instructions stored in memory 202, such that the capabilities of the UEA system 200 are implemented according to example embodiments. Memory 202 may include non-volatile and/or volatile memory.

The UEA system 200 may include one or more input/output devices 204 that are capable of receiving and/or outputting information. In an embodiment, the input/output devices 204 may include a display and an input device. The input/output device 204 may be a single device or a combination of devices.

The display may be monochrome or color. For example, the display may be a plasma, liquid crystal, or cathode ray tube type display. The display may be a touch screen type display. The UEA system 200 may have more than one display. The multiple displays may be different types of displays. The display may have sub-displays thereon. For example, the display may have a large display surface. The display for the user interface may occupy a portion or less than the whole of the large display surface.

Input devices may include a keyboard, which can be a full-sized QWERTY keyboard or a condensed keyboard. Input devices may further include a numeric pad, an alpha-numeric pad, a trackball, a touchpad, a mouse, and/or fixed selection buttons. As described above, the display may serve as an input device through using or incorporating a touch-screen interface.

In some embodiments, the input/output devices 204 may include one or more cameras, optical sensors, biofeedback sensors, or other sensing devices.

The interface 205 may be employed to commutatively couple the internal hardware and software components of the UEA system 200. The interface 205 can be, for example but not limited to, one or more buses or other wired or wireless connections, as is known in the art.

The UEA system 200 may include a positive appraisal collection module 206. According to an example embodiment, one or more positive appraisal sensations may be collected by the UEA system 200 in response to conducting an experience assessment with the user. In the embodiments, positive appraisal data may be considered any sensation, such as physiological activity, that may be positively identified and/or measured from the user. Positive appraisal sensations may be associated with human emotions that may be connotatively considered positive or negative. Examples of positive appraisal sensations may include, but are not limited to, happiness, fear, joy, anger, bravery, warmth, tingling, and the like. One or more positive appraisal sensations experienced by the user may be transmitted to (e.g. biofeedback sensor), and/or entered into (e.g., I/O device) the UEA system 200. The positive appraisal sensations may be conveyed to the positive appraisal collection module 206 by any communications medium, such as electrical signals, for example. Furthermore, electronic transmission may be initially received via a communications network, for example, by a suitable UEA system component. The input/output device 204 or a network interface, for instance, may function to receive the positive appraisal sensations. Accordingly, the received positive appraisal sensations may be electronically transferred to the positive appraisal collection module 206 for storage. In an embodiment, the positive appraisal collection module 206 may store the collected quantitative appraisal data and the qualitative appraisal data separately. Thereafter, the positive appraisal collection module 206 may operate to store the collected positive appraisal sensations using various temporary and/or persistent storage mechanisms. The positive appraisal collection module may operate to organize a plurality of collected appraisal data according to various grouping factors, including but limited to, the user, the positive appraisal experience, the experience assessment, or any other category that may be deemed appropriate and/or necessary.

A positive appraisal analysis module 207 may be employed to qualitatively and quantitatively analyze the collected positive appraisal data. The positive appraisal analysis module 207 may receive, and subsequently parse, the positive appraisal data received from the positive appraisal collection module 206. Thereafter, the positive appraisal analysis module 207 may evaluate the received positive appraisal data. In an embodiment, a triangulation algorithm may be employed as a mechanism to cross-validate data from the qualitative and/or quantitative segments of the positive appraisal sensation data. The positive appraisal analysis module 207 may employ various qualitative and/or quantitative algorithms in order to identify classifications of positive appraisal sensations, namely positive appraisal sensation categories.

The qualitative analysis module 207 may further analyze positive appraisal categories. The qualitative analysis module 207 may operate to determine an ordered sequence of the identified positive appraisal categories, based on one or more factors. Examples of sequences determined by the qualitative analysis module 207 may include rating, ranking, weighing, and the like. In an embodiment, the qualitative analysis module 207 may employ an algorithm, such as a raking algorithm, to determine a rank corresponding to each positive appraisal category. A rank may be calculated based on a total number of occurrences associated with the positive appraisal category, for instance. Various known algorithms may be employed to rank, or otherwise order, the one or more positive appraisal categories.

A value-congruence module 208 may be included. The value-congruence module 208 may be employed to further evaluate the analyzed positive appraisal data, so as to generate a context specific recommendation profile. Subsequently, the value-congruence module 208 may perform various comparisons between the generated recommendation profile and previously coded content. The comparisons may be text based, for example. Further, comparisons may be applied to one or more segments of positive appraisal data which comprise the recommendation profile and the coded content. In some embodiments, the value-congruence module 208 may consider factors derived from, or otherwise associated with, the positive appraisal data such as various parameters, rankings, attributes, classifications, and the like.

In an embodiment, the value-congruence module 208 may determine value-congruency by identifying that a positive appraisal category included in a recommendation profile matches a category indicated by the coded content. For example, the value-congruence module 208 may identify the same positive appraisal category of "humor" in the recommendation profile and a code associated with a particular content item. In this instance, the value-congruence module 208 considers value-congruency to exist between the recommendation profile and the content. In some embodiments, the value-congruence module 208 may require one match, or a predetermined number of matches, to be identified in order to determine value-congruency. Alternatively, other evaluations may be employed, for example percentages or thresholds, for value-congruency to be determined. It should be appreciated that any known algorithm or calculation may be implemented by the value-congruence module 208 in order to accomplish the value-congruence operations of the embodiments.

Also, it should be appreciated that a function described herein as being performed at a particular module may be performed at one or more other modules and/or by one or more other devices instead of or in addition to the function performed at the particular module.

Figure 3:
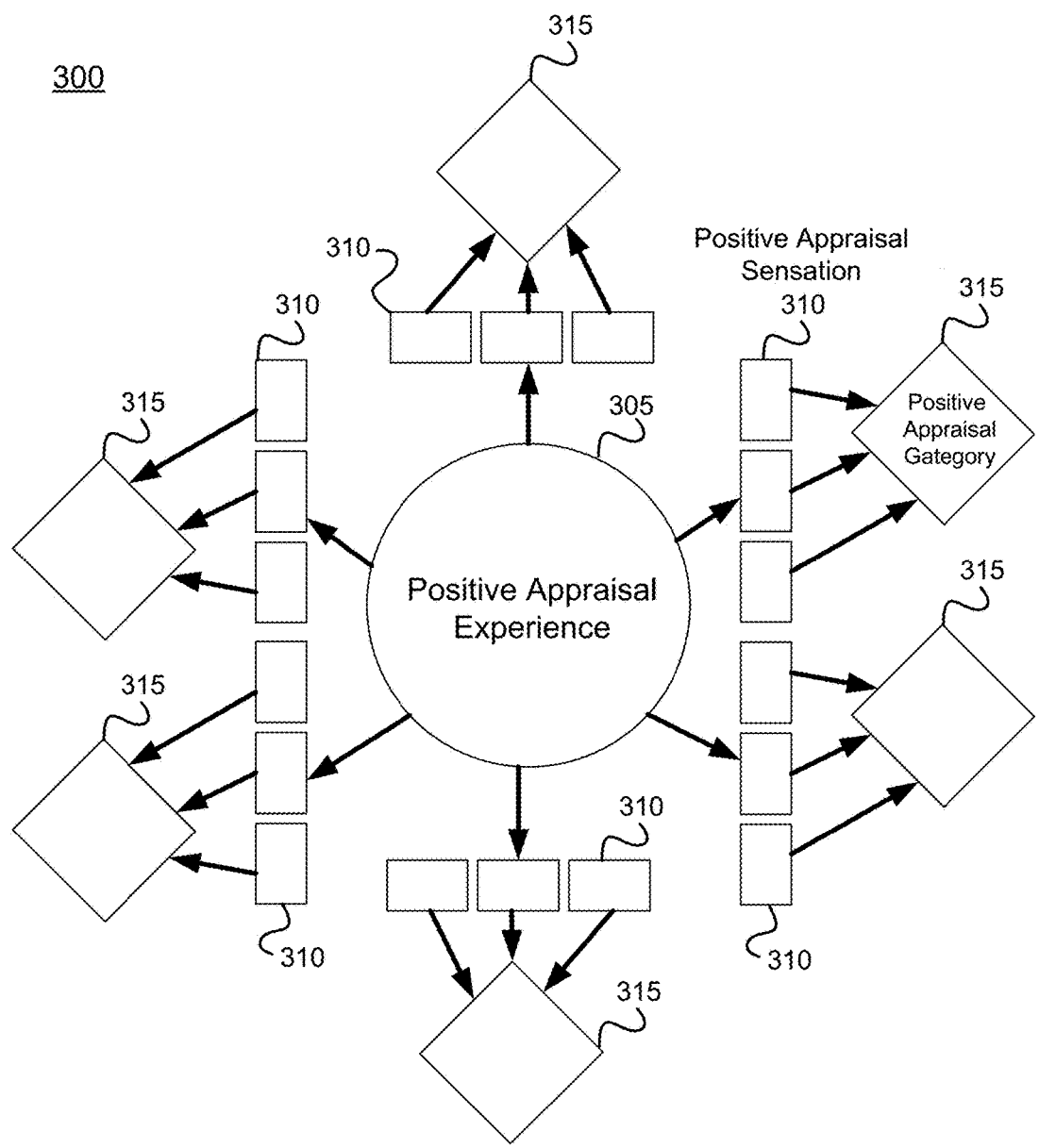
FIG. 3 illustrates data model for organizing and maintaining positive appraisal data in accordance with and example embodiments.

FIG. 3 depicts a data model 300 for organizing and maintaining positive appraisal data, in accordance with example embodiments. Specifically, the data model 300 may maintain logical relationships and/or physical relationships between the various types of positive appraisal data. Subsequently, the UEA system may employ the data model 300 during data analysis and determining value-congruence between positive appraisals and categorized content. In various embodiments, the data model 300 may be created by the UEA system to include data types, data attributes, and data relationships. Also, the data model 300 may maintain tables, columns, and keys to support physical data manipulation, for example indexing, within databases.

The data model 300 may be comprised of one or more data objects including, positive appraisal experience 305, positive appraisal sensation 310, and positive appraisal category 315. A positive appraisal experience 305 may be associated with one or more positive appraisal sensations 310. Further, the positive appraisal sensations may be qualitatively and quantitatively analyzed, and thereafter aggregated according to various determined positive appraisal categories 315. The positive appraisal categories 315 may serve to characterize the data and link the described sensations to relevant, or value-congruent, content. In an embodiment, the data structure may be arranged in a hierarchical structure. For example, the one or more positive appraisal categories 315 may be grouped into an ordered sequence, such as a ranking based on a count of the occurrences. This embodiment may serve to indicate which types of user emotions, or sensations, are exemplified most frequently by a particular user. Accordingly, higher ranking positive appraisal categories 315 may suggest a stronger relevancy between user preferences and the content.

Figure 4A:
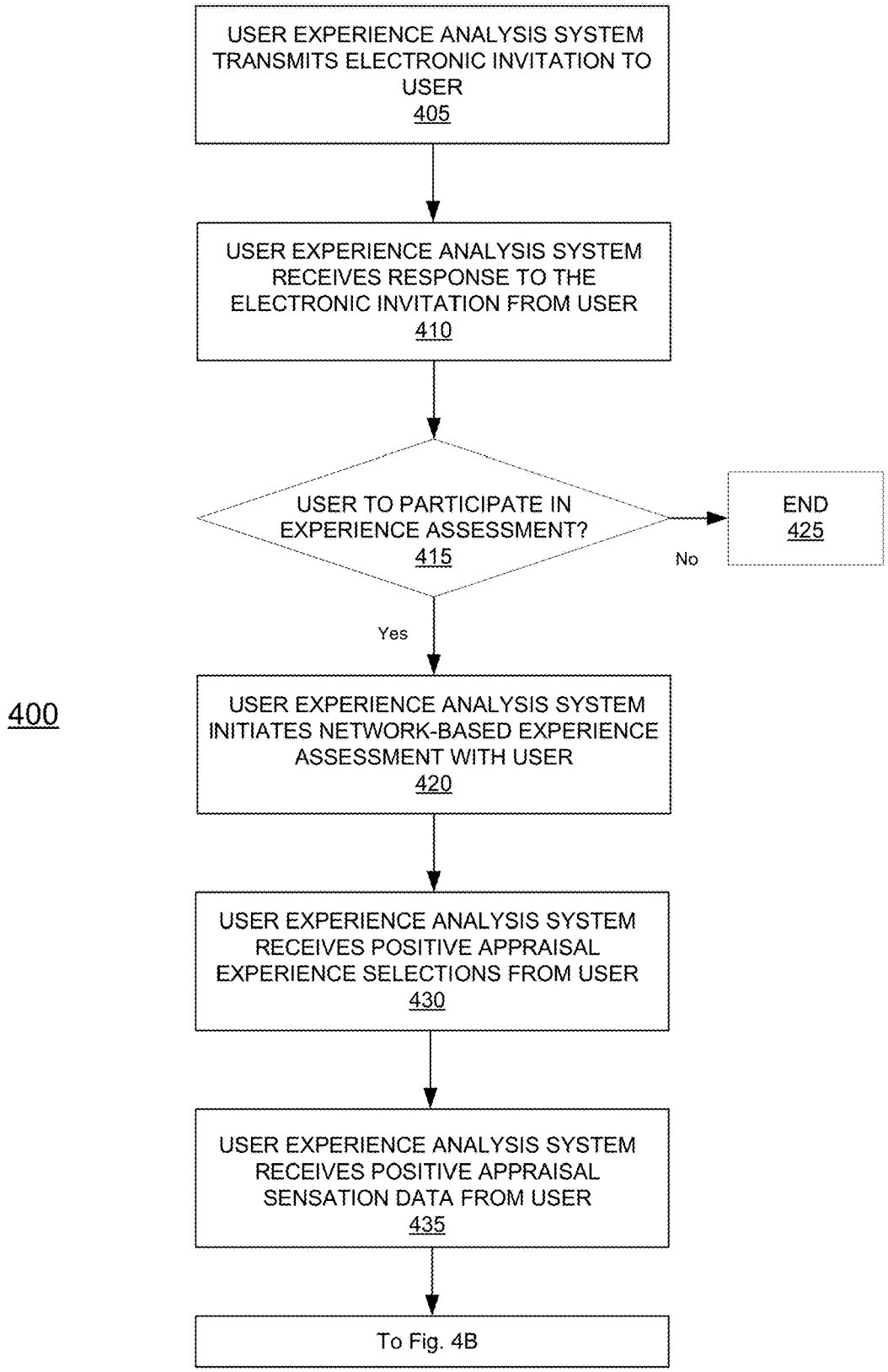
FIGS. 4A-4B illustrate a flow diagram of the method for performing qualitatively and quantitatively analysis of user experiences in order to provide content recommendations, in accordance with example embodiments.
Figure 4B:
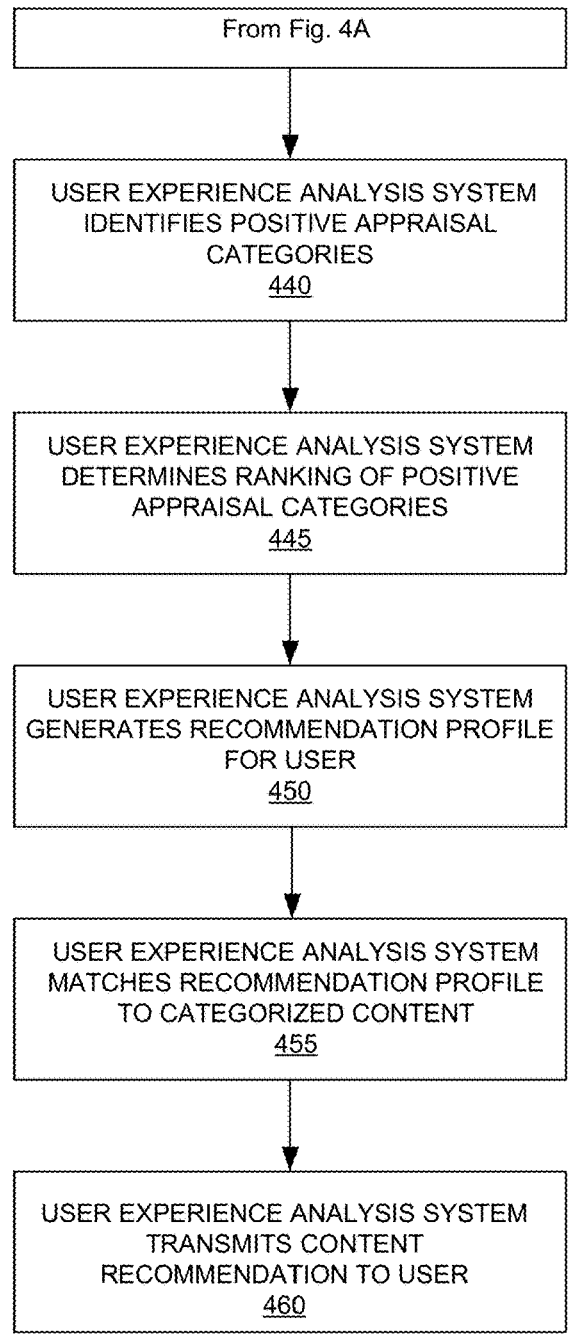

FIGS. 4A-4B depict a flow chart of a method for performing qualitatively and quantitatively analysis of user experiences in order to provide content recommendations, in accordance with an example embodiment. The method 400 as shown in FIGS. 4A-4B may be executed or otherwise performed by one or a combination of various systems and devices, such as UEA system 110 as illustrated in FIG. 1, UEA system 200 as depicted in FIG. 2.

At step 405, the UEA system may transmit an electronic message, for example an email, to a user via a communications network. In the example embodiment, a user may receive an invitation to view content and participate in an experience assessment associated with the qualitative and/or quantitative analysis performed according to the embodiments. The user may employ a client device, such as desktop computer, that can be connected to the communications network and run software which facilitates communication with the UEA system. According to the embodiments, the electronic message may serve as an invitation to participate in one or more experience assessments supported by the UEA system. The electronic message may be implemented using various network-based communication mechanisms, including but not limited to, electronic messaging, instant messaging, Voice Over Internet Protocol (VoIP), email, and the like. In an embodiment, the invitation may include information, such as a consent form, advising the user of technological requirements and time constraints associated with the one or more experience assessments.

At step 410, the UEA system may receive a response from the user to indicate participation in the various experience assessments. In an embodiment, the response may also be a communications network-based message, and may be transmitted via a communications network in a similar manner to the invitation. The UEA system employs an interface with the communications network for electronically receiving the response from the user. According to another embodiment, the electronic invitation may include one or more selectable options that specify the user's response. Subsequently, the designated response may be transmitted to the UEA system. For example, a Hypertext Transfer Protocol (HTTP) link may be included in the electronic message that the user may select, or "click", upon choosing to participate in the experience assessment. Other conventional user input mechanisms may be employed to communicate the user response to the UEA system, such as, but not limited to, checkboxes, dropdown lists, selectable icons, textboxes, and the like.

At step 415, upon receiving the response, the UEA system may determine whether the user has selected to participate in the user experience assessments according to the embodiments. The determination may be accomplished by employing the processor of the UEA system, for example. In the instance where the UEA system determines that user has positively selected to participate in the experience assessment based on the response (i.e., "Yes"), the method proceeds to step 420. Otherwise, if the UEA system determines that the user has responded to not participate in the experience assessment (i.e., "No") then the method 400 may end at step 425. According to the embodiments, ending method 100 may be implemented using any suitable manner of termination, such as no further interaction with the user, sending a message to the user, or returning to step 405 for a maximum number of iterations.

At step 420, the UEA may initiate a network-based experience assessment with the user. In an embodiment, the UEA may initiate the assessment by querying user to access and consume electronic content that is associated with an experience assessment. For example, the UEA system may transmit a URL in the invitation that allows the user to download and view a particular on-line movie. According to example embodiments, the content may be deemed relevant to one or more experience assessments, and subsequently selected to accompany the assessment. The UEA may further provide the user with options of viewing supplementary content within an optional predetermined time period (e.g., hours, days, etc.). As an example, an electronic invitation can request the user to watch an on-line movie, and later watch two or more additional movies within the optional specified time-period of 20 days. The electronic invitation may additionally include other data regarding requirements, such as technological and system requirements, necessary for the user to participate in the qualitative analysis.

According to an embodiment, step 420 may include the UEA system communicating a preliminary assessment. The preliminary assessment may be a simple evaluation that serves as a baseline for the user's experiences and/or sensations. The UEA system may transmit an electronic message, such as an email, via a communications network, which contains the preliminary assessment. Thereafter, the UEA may employ the preliminary assessment results to qualitatively assesses the user's overall well-being. Examples of subjective well-being assessments include, but are not limited to, the Subjective Well-Being Scales which consists of the Satisfaction With Life Scale (SWLS), Scale of Positive and Negative Experiences (SPANE), Flourishing Scale (FS), and the like. Alternatively, other electronic distribution mechanisms, such as an Uniform Resource Locator (URL), may be employed to direct the user to one or more baseline assessments supported by the UEA.

In the example embodiment, communications network may be a wired connection, a LAN, a WAN, the Internet, or other packet-switched data networks. Furthermore, a communications network may support wireless data connections. In such an embodiment, Wi-Fi, IEEE 802.11, or another type of wireless access points coupled to a data-packet network may be employed. Accordingly, a variety of different configurations are contemplated.

At step 430, the UEA system may receive positive appraisal experience selections from the user. In an embodiment, the UEA system conducts network-based communications, such as a videoconference, to conduct an experience assessment with the user. The experience assessment may be supported using any one of, or a combination of, the conventional telecommunication technologies that allows computer users to exchange audio, visual, and multimedia content in real-time. These types of telecommunication technologies include, but are not limited to, videoconferencing systems, application sharing systems, telephony systems, electronic meeting systems. Accordingly, during the experience assessment, the UEA system presents one or more predetermined positive appraisal experiences to the user. For example, a semi-structured Internet based videoconference may be used to present the user with a list of one or more positive appraisal experience types.

In an embodiment, the positive appraisal experiences may be related to events associated with the purchase and/or viewing of various types of content. For instance, the positive appraisal experiences may be associated with watching a movie, reading a book, attending the theater, and the like. The positive appraisal experiences may be previously stored in a memory and/or storage device of the UEA system 300. It should be appreciated that the predetermined positive appraisal experiences may be obtained from a sample set of users, collected during previous UEA system communications, or selectively entered by an administrator of the UEA system. Alternatively, any manner of acquiring information that is deemed necessary and/or appropriate may be employed by the UEA system to obtain the positive appraisal experiences.

At step 430, a graphical user interface (GUI) may be displayed to the user during the experience assessment. The GUI may allow the UEA system to receive various user selections. The received selections may indicate one or more experiences, from the provided list, that are qualitatively "positive" for the particular user. The GUI may present one or more selection options that correspond to a positive appraisal experiences, in for the user to make a selection. Each option may be represented by an icon and/or text describing the transaction request. In an embodiment, the user may be limited to a maximum and/or minimum number of positive appraisal experiences that may be selected from those provided. For example, during the experience assessment, the user may be requested to select their "top 3 positive appraisal experiences" from a displayed list of 50 predetermined positive appraisal experiences.

At step 435, the UEA system receives positive appraisal sensation data from the user. In an embodiment, the user may communicate one or more positive appraisal sensations that correspond to each of the selected appraisal experiences. Then, the UEA system may perform the qualitative and quantitative analysis functions of the embodiments using the received positive appraisal sensation data. These positive appraisal sensations may be associated with individual emotional reactions, or feelings, that may be personally experienced and described by the user as a result of the viewing the particular content media. In another embodiment, the positive appraisal sensations may correspond to particular user behavior related to the content experience. User behavior may be associated with particular actions performed by the user, in response to specific events or content. In accordance with the embodiment, user behavior may include, but is not limited to, user purchasing history, user web browsing history, user content selection history, and the like. In an embodiment, the positive appraisal sensations may be experienced by the user while viewing the on-line movies, as indicated in the invitation. For instance, after a user selects three positive appraisal experiences (e.g., movies, books, theater) the user may subsequently communicate the sensations described while undergoing the particular experience. Through the user's memory of a positive experience, specific qualitative data and quantitative data may be collected and evaluated to further characterize a particular user's behavior and preferences.

In an embodiment, the positive appraisal sensations received at step 435 may include qualitative data. Qualitative data may be comprised of subjective scales, psychological sensations, and/or emotions. Qualitative types of positive appraisal sensations may be feelings of happiness, fear, or excitement, for example. The qualitative data may be directly entered by the user into a user device, such as a personal computer. For example, the user may select one or more positive appraisal sensations using a mouse, a pointing device, or a touch screen computer display. Subsequently, the positive appraisal sensations may be electronically transmitted by the user device, via a communications network, and received by the UEA system. Alternatively, qualitative data may be communicated to the UEA system from a source other than the user device. For example, an administrator participating in a videoconference interview may enter qualitative data into a portable computing device, such a laptop computer, that may be communicatively coupled to a communications network, such as the Internet and/or a local area network. According to this embodiment, the qualitative data may be associated with visually observed behavior (e.g., emotional speech, physical gestures, facial expressions, etc.) by the administrator while the user describes a positive appraisal experience. Qualitative data may be communicatively transmitted via the communications network, and received by the UEA system. As should be appreciated, any manner of acquiring qualitative data that is deemed necessary and/or appropriate may be employed by the UEA system to receive the qualitative segments of positive appraisal sensation data.

According to example embodiments, the positive appraisal sensations received at step 435 may include quantitative data. Quantitative data may be comprised of physiological measurements that may serve to reflect human sensations and biological changes in conjunction with thoughts, emotions, and behavior. Accordingly, the physiological measurements may comprise quantified physical and/or chemical activities which include, but are not limited to, heart rate, blood pressure, muscle stress, brain activity, hormones, and other physiological functions as is known in the art. In an embodiment, these physiological functions may be measured to obtain one or more quantitative values, or physiological measurements, that are subsequently associated with positive appraisal sensations. For example, a user device may be communicatively coupled to one or more biofeedback sensors that measure the user's physiological activity during the experience assessment. Thereafter, the user device transmits the quantitative data, such as electrical activity in the brain, to the UEA system as the quantitative portion of the positive appraisal sensation. Examples of biofeedback sensors may include, but are not limited to electromyographs (EMG), thermometers, electroencephalographs (EEG), sphygmomanometers and the like. The biofeedback sensors may be implemented within the UEA system as software, firmware, hardware, and/or various combinations thereof. In an embodiment, the biofeedback sensors may be communicatively coupled to a communications network, such as the Internet and/or a local area network. As should be appreciated, any manner of acquiring quantitative data that is deemed necessary and/or appropriate may be employed by the UEA system to receive the quantitative segment of positive appraisal sensation data.

In some embodiments, at step 435, the UEA system may receive one or more additional positive appraisal sensation data from the user. The additional positive appraisal sensations may be generated from a subjective self-assessment performed by the user. In the embodiment, the additional positive appraisal sensation data may be employed to supplement the positive appraisal sensation data resulting from the system-generated assessment, initiated in step 420. Accordingly, the UEA system may utilize data associated with the self-assessment and/or the system-generated for performing qualitative and quantitative analysis.

At step 440, the UEA system may identify one or more positive appraisal categories. In the example embodiment, the UEA system may perform qualitative and/or quantitative analysis on the received positive appraisal sensation data in order to determine relevancy factors such as relationships, trends, and characteristics that may be employed to further aggregate and apply the received data. In some embodiments, the UEA system may operate to determine one or more positive appraisal categories that correspond with each of the user's positive appraisal sensations. Alternatively, the positive appraisal sensations may be grouped, or otherwise aggregated, in order to identify one or more positive appraisal categories that may be indicated by the relevancy factors. The positive appraisal categories may be classifications that characterize the types of behavior and/or emotions that may further indicate preferences for the particular user. For example, a positive appraisal category of "humor" may be determined from analyzing the sensations of laughter and warmth triggered by watching an on-line movie.

In an embodiment, the positive appraisal categories may be associated with one or more character strength values. A character strength value may be one or more characteristics employable by the UEA system to describe the behavior and/or emotions of the user. Furthermore, a character strength value may indicate a recognized pattern or trend, which may be suggestive of the user's behavior and/or emotions. An example of a character strength may be "bravery", for example.

At step 445, the UEA system may determine rankings associated with the positive appraisal categories. In an example embodiment, the rank may be determine based on the frequency for each identified positive appraisal category. The UEA system may calculate the number of occurrences corresponding to each identified positive appraisal category. For instance, the UEA system may count each time a positive appraisal category of "humor" was identified during the experience of watching an on-line movie. The number of occurrences for an identified positive appraisal category may be calculated spanning the entire assessment, or multiple assessments. The UEA system may assign ranks directly based on a the calculated number of occurrences. For instance, 100 or more occurrences may receive rank of 1, 50 to 99 occurrences may receive a rank of 2, and so forth. Alternatively, the positive appraisal categories may be ranked in the relation to each other. In some embodiments, the positive appraisal categories may be arranged in a sequential order that is either ascending or descending, based on the frequency, and subsequently assigned a rank corresponding to the order. According to the embodiment, higher rankings may be an indication of increased relevancy of the positive appraisal category to the user's preferences.

At step 450, the UEA system may generate a recommendation profile for the user. One or more recommendation profiles may be generated that correspond to each user of the UEA system. A recommendation profile may comprise positive appraisal categories associated with the user. In the example embodiment, the recommendation profile may be comprised of a predetermined number of positive appraisal categories with the highest rankings. For example, positive appraisal categories with the user's "top 5" rankings may be included in the generated recommendation profile. In some embodiments, the recommendation profile may comprise any combination of positive appraisal data resulting from the qualitative and/or quantitative analysis performed by the UEA system. Thus, the recommendation profile may be employed for maintaining user-specific data relevant to the user's preferences, and thereby suitable for predicting relevant content. In some embodiments, the UEA system may update the recommendation profile at one or more predetermined intervals, such as every 30 days.

In an embodiment, the UEA system may access previously created recommendation profiles. The UEA system may operate to upload, or otherwise retrieve, a dataset the may contain one or more predetermined recommendation profiles that have been created using the assessment and/or analysis functionalities of the embodiments. Thus, the predetermined recommendation profiles may contain positive appraisal categories that may serve to characterize the corresponding predetermined users. Subsequently, the UEA system may further evaluate and/or analyze the recommendation profile created in step 450 according to the one or more previously created recommendation profiles. In an embodiment, the UEA system may perform a matching of the created recommendation profiles and the predetermined recommendation profiles. Accordingly, the UEA system may also determine value-congruence with users that have been previously assessed or otherwise previously interacted with the system.

At step 455, the UEA system may operate to match the recommendation profile to one or more categorized content. In various embodiments, each content category may correspond to a positive appraisal category employed by the UEA system. A content category may serve to characterize the content. Furthermore, a category may be indicative of a relationship between the content and particular user behavior and/or emotions. Each element of electronic content may be stored with one or more associated codes. The code may indicate a category, and subsequently a positive appraisal category, that corresponds to the content. For instance, an online movie may be coded to the "humor" category. The code may be implemented as an electronic indicator, such as a bit. In an embodiment, the content may be categorized by a trusted source, such as an assessment administrator or the content provided.

According to example embodiments, the UEA may determine value-congruence, or matches, between content and recommendation profiles that correspond to the same user behavior and/or emotions. Therefore, the UEA system functions to determine user relevant content, based on these factors. The UEA system may recognize a match between the online movie coded to the "humor" and the recommendation profile comprising the positive appraisal category "humor", for example. In an embodiment, the UEA system may search for matching content. Particularly, the UEA system may iteratively conduct matching operations for each content element stored by the system. In another embodiment, the system may selectively conduct matching operations on particular content elements, such as content requested by the user.

At step 460, the UEA system may transmit one or more content recommendations to the user. Based on the matches determined by the UEA system in step 455, the system may generate content recommendation information to be presented to the user. The content recommendation information may include one or more indications that serve to indicate, or otherwise represent, content determined to be relevant to the user. Examples of indications may include, but are not limited to lists, HTTP links, URLs, descriptions, icons, thumbnails and the like. The UEA system may recommend each content element and/or a portion of the content elements that match a user's recommendation. According to example embodiments, the UEA system may generate an electronic message, such as an email, that includes the content recommendation information. Thereafter, the user computer may receive and display the content recommendation message, including the list of recommended content, to the user. In some embodiments, the content recommendation transmitted to the user may also include the content, itself. In an alternative embodiment, the content recommendation may include a mechanism to access or download the content. The UEA system may transmit the recommendation information to a user via a communications network. It should be appreciated that the UEA system may employ any known mechanism for transmitting, or otherwise conveying, the content recommendations to the user.

In another embodiment, the content recommendations may be transmitted, or otherwise conveyed, to one or more data sources from the UEA system. Thereafter, the content recommendations may be employed by the one or more data sources, so as to accomplish personalization of data distributed to the particular user. For instance, a data source which provides a webpage, may receive one or more content recommendations associated with a user. Accordingly, the data source may employ the content recommendations to particularly include and/or exclude data displayed by the webpage based on the user relevancy, as a result of the received content recommendation.

Hereinafter, physical aspects of implementation of the example embodiments will be described. As described above, example methods may be computer implemented as a system. The system or portions of the system may be in the form of a "processing machine," for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The description of example embodiments describes servers, portable electronic devices, and other computing devices that may include one or more modules, some of which are explicitly depicted in the figures, others are not. As used herein, the term "module" may be understood to refer to executable software, firmware, hardware, and/or various combinations thereof. It is noted that the modules are example. The modules may be combined, integrated, separated, and/or duplicated to support various applications. Also, a function described herein as being performed at a particular module may be performed at one or more other modules and/or by one or more other devices (e.g., servers) instead of, or in addition to, the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software and/or combinations thereof. Moreover, the figures illustrate various components (e.g., servers, portable electronic devices, client devices, computers, etc.) separately. The functions described as being performed at various components may be performed at other components, and the various components may be combined and/or separated. Other modifications also may be made.

According to example embodiments, the systems and methods may be computer implemented using one or more computers, incorporating computer processors. The computer implementation may include a combination of software and hardware. The computers may communicate over a computer based network. The computers may have software installed thereon configured to execute the methods of the example embodiments. The software may be in the form of modules designed to cause a computer processor to execute specific tasks. The computers may be configured with hardware to execute specific tasks. As should be appreciated, a variety of computer based configurations are possible.

The processing machine described above may also utilize any of a wide variety of other technologies including a special purpose computer, a computer system including a microcomputer, mini-computer or mainframe, for example, a programmed microprocessor, a micro-controller, a PICE (peripheral integrated circuit element), a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices, for example, capable of implementing the steps of the process.

It is appreciated that in order to practice the methods as described above, it is not necessary that the processors and/or the memories of the processing machine be physically located in the same geographical place. For example, each of the processors and the memories and the data stores used may be located in geographically distinct locations and connected so as to communicate in any suitable manner. Additionally, it is appreciated that each of the processor and/or the memory and/or data stores may be composed of different physical pieces of equipment. Accordingly, it is not necessary that the processor be one single piece of equipment in one location and that the memory be another single piece of equipment in another location. For example, it is contemplated that the processor may be two or more pieces of equipment in two or more different physical locations. These two or more distinct pieces of equipment may be connected in any suitable manner. Additionally, the memory may include two or more portions of memory in two or more physical locations. Additionally, the data storage may include two or more components or two or more portions of memory in two or more physical locations.

To explain further, processing as described above is performed by various components and various memories. However, it is appreciated that the processing performed by two distinct components as described above may, in accordance with further embodiments, be performed by a single component. Further, the processing performed by one distinct component as described above may be performed by two distinct components. In a similar manner, the memory storage performed by two distinct memory portions as described above may, in accordance with a further embodiment, be performed by a single memory portion. Further, the memory storage performed by one distinct memory portion as described above may be performed by two memory portions. It is also appreciated that the data storage performed by two distinct components as described above may, in accordance with a further embodiment, be performed by a single component. Further, the data storage performed by one distinct component as described above may be performed by two distinct components.

As described above, a set of instructions is used in the processing of various embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming or any other suitable programming form. The software tells the processing machine what to do with the data being processed.

Further, it is appreciated that the instructions or set of instructions used in the implementation and operation of the various embodiments may be in a suitable form such that the processing machine may read the instructions. For example, the instructions that form a program may be in the form of a suitable programming language, which is converted to machine language or object code to allow the processor or processors to read the instructions. For example, written lines of programming code or source code, in a particular programming language, are converted to machine language using a compiler, assembler or interpreter. The machine language is binary coded machine instructions that are specific to a particular type of processing machine, e.g., to a particular type of computer, for example. The computer understands the machine language.

Any suitable programming language may be used in accordance with the various embodiments. Illustratively, the programming language used may include assembly language, ActionScript, Ada, APL, Basic, C, C++, C#, COBOL, Ceylon, Dart, dBase, F#, Fantom, Forth, Fortran, Go, Java, Jquery, Modula-2, .NET, Objective C, Opa, Pascal, Prolog, Python, RUM Ruby, Visual Basic, X10, and/or JavaScript, for example. Further, it is not necessary that a single type of instructions or single programming language be utilized in conjunction with the operation of the system and method of various embodiments. Rather, any number of different programming languages may be utilized as is necessary or desirable.

Also, the instructions and/or data used in the practice of the various embodiments may utilize any compression or encryption technique or algorithm, as may be desired. An encryption module might be used to encrypt data. Further, files or other data may be decrypted using a suitable decryption module, for example.

As described above, various embodiments may illustratively be embodied in the form of a processing machine, including a computer or computer system, for example, that includes at least one memory. It is to be appreciated that the set of instructions, e.g., the software, for example, that enables the computer operating system to perform the operations described above, may be contained on any of a wide variety of computer readable media, as desired. Further, the data, for example, processed by the set of instructions might also be contained on any of a wide variety of media or medium. For example, the particular medium, e.g., the memory in the processing machine, utilized to hold the set of instructions and/or the data used, may take on any of a variety of physical forms or transmissions. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the system.

Further, the memory or memories used in the processing machine that implements the various embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the various embodiments, a variety of "user interfaces" may be utilized to allow a user to interface with the processing machine or machines that are used to implement various embodiments. As used herein, a user interface includes any hardware, software, or combination of hardware and software used by the processing machine that allows a user to interact with the processing machine. A user interface may be in the form of a dialogue screen, for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is contemplated that the user interface might interact, e.g., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

While the various embodiments have been particularly shown and described within the UEA system, it will be appreciated that variations and modifications may be effected by a person of ordinary skill in the art without departing from the scope of the various embodiments. Furthermore, one of ordinary skill in the art will recognize that such processes and systems do not need to be restricted to the specific embodiments described herein. Other embodiments, combinations of the present embodiments, and uses and advantages will be apparent to those skilled in the art from consideration of the specification and practice of the various embodiments disclosed herein. The specification and examples should be considered example.

Accordingly, while the various embodiments are described here in detail in relation to the example embodiments, it is to be understood that this disclosure is only illustrative and example and is made to provide an enabling disclosure. Accordingly, the foregoing disclosure is not intended to be construed or to limit the various embodiments or otherwise, to exclude any other such embodiments, adaptations, variations, modifications, and equivalent arrangements.

What is claimed is:

1. A method, comprising:
   initiating, by one or more computing devices, a user experience assessment with a user computer via a communications network, wherein the user experience assessment comprises one or more predetermined content consuming experiences;
   receiving, by the one or more computing devices, positive appraisal sensation data from the user computer, wherein the positive appraisal sensation data comprises user responses associated with the one or more predetermined content consuming experiences;
   using, by the one or more computing devices, one or more analysis algorithms in order to analyze the positive appraisal sensation data;
   determining, by the one or more computing devices, one or more positive appraisal categories corresponding to the positive appraisal sensation data, wherein the one or more positive appraisal categories are determined based on the analysis;

ranking, by the one or more computing devices, each of the one or more positive appraisal categories based on a predetermined frequency for each of the one or more positive appraisal categories, wherein the one or more positive appraisal categories are arranged in a sequential order based on the ranking;

generating, by the one or more computing devices, a recommendation profile associated with a user, wherein the recommendation profile comprises the one or more positive appraisal categories each associated with the ranking;

determining, by the one or more computing devices, value-congruency between the recommendation profile and coded content based on at least a predetermined number of matches between the recommendation profile and the coded content or at least a predetermined fraction or threshold indicative of a required level of similarity between the recommendation profile and the coded content, wherein the coded content is based at least upon information retrieved from scanned text;

generating, by the one or more computing devices, content recommendation information based on the determined value-congruency; and transmitting, by the one or more computing devices, an electronic message to the user via the communications network, wherein the electronic message comprises the content recommendation information.

2. The method of claim 1, wherein the positive appraisal sensation data comprises psychological activity associated with the user in response to the one or more predetermined content consuming experiences.

3. The method of claim 1, wherein the positive appraisal sensation data comprises physiological activity associated with the user in response to the one or more predetermined content consuming experiences.

4. The method of claim 3, further comprising:
receiving, by the one or more computing devices, one or more measurements associated with the physiological activity, wherein the one or more measurements are obtained by a biofeedback sensor.

5. The method of claim 1, wherein the coded content is associated with one or more predetermined content categories.

6. The method of claim 5, wherein determining the value-congruency comprises identifying one or more positive appraisal categories that correspond to the one or more predetermined content categories.

7. The method of claim 1, wherein the coded content has been automatically data mined from one or more content providers via the communications network.

8. The method of claim 7, wherein the coded content has been aggregated into one or more determined content categories according to characteristics as a result of evaluating the data mined content.

9. A system, comprising:
a communications network;
a user computer commutatively coupled to the communications network;
and one or more computing devices communicatively coupled to the communications network, wherein the one or more computing devices operate to:

initiate a user experience assessment with the user computer via the communications network, wherein the user experience assessment comprises one or more predetermined content consuming experiences;

receive positive appraisal sensation data from the user computer, wherein the positive appraisal sensation data comprises user responses associated with the one or more predetermined content consuming experiences;

use one or more analysis algorithms in order to analyze the positive appraisal sensation data;

determine one or more positive appraisal categories corresponding to the positive appraisal sensation data, wherein the one or more positive appraisal categories are determined based on the analysis;

rank each of the one or more positive appraisal categories based on a predetermined frequency for each of the one or more positive appraisal categories, wherein the one or more positive appraisal categories are arranged in a sequential order based on the ranking;

generate a recommendation profile associated with a user, wherein the recommendation profile comprises the one or more positive appraisal categories each associated with the ranking;

determine value-congruency between the recommendation profile and coded content based on at least a predetermined number of matches between the recommendation profile and the coded content or at least a predetermined fraction or threshold indicative of a required level of similarity between the recommendation profile and the coded content, wherein the coded content is based at least upon information retrieved from scanned text;

generate content recommendation information based on the determined value-congruency; and transmit an electronic message to the user computer via the communications network, wherein the electronic message comprises the content recommendation information.

10. The system of claim 9, wherein the positive appraisal sensation data comprises psychological activity associated with the user in response to the one or more predetermined content consuming experiences.

11. The system of claim 9, wherein the positive appraisal sensation data comprises physiological activity associated with the user in response to the one or more predetermined content consuming experiences.

12. The system of claim 11, further comprising:
a biofeedback sensor communicatively coupled to the user computer devices, wherein the biofeedback sensor obtains one or more measurements associated with the physiological activity.

13. The system of claim 9, wherein the coded content is associated with one or more predetermined content categories.

14. The system of claim 13, wherein the one or more computing devices further operate to: identify one or more positive appraisal categories that correspond to the one or more predetermined content categories, in order to determine the value-congruency.

15. The system of claim 14, wherein the coded content has been aggregated into one or more determined content categories according to characteristics as a result of evaluating the data mined content.

* * * * *